(12) United States Patent
Kwon et al.

(10) Patent No.: US 12,280,712 B2
(45) Date of Patent: Apr. 22, 2025

(54) VEHICLE VANITY LAMP

(71) Applicant: DAEHAN SOLUTION CO., LTD, Incheon (KR)

(72) Inventors: Choong Ho Kwon, Seoul (KR); Young-Hoon Kim, Incheon (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 0 days.

(21) Appl. No.: 18/886,089

(22) Filed: Sep. 16, 2024

(65) Prior Publication Data
US 2025/0091506 A1    Mar. 20, 2025

(30) Foreign Application Priority Data
Sep. 20, 2023    (KR) ......................... 10-2023-0125347

(51) Int. Cl.
*B60Q 3/20* (2017.01)
*B60Q 3/51* (2017.01)
*B60Q 3/54* (2017.01)
*B60Q 3/74* (2017.01)
*B60Q 3/76* (2017.01)
*F21V 21/04* (2006.01)

(52) U.S. Cl.
CPC .................. *B60Q 3/20* (2017.02); *B60Q 3/51* (2017.02); *B60Q 3/54* (2017.02); *B60Q 3/74* (2017.02); *B60Q 3/76* (2017.02); *F21V 21/046* (2013.01)

(58) Field of Classification Search
CPC ... B60Q 3/20; B60Q 3/51; B60Q 3/54; B60Q 3/76; B60Q 3/74; F21V 21/04; F21V 21/041; F21V 21/044; F21V 21/042; F21V 21/046; F21V 21/049
USPC .......................................................... 362/549
See application file for complete search history.

(56) References Cited

U.S. PATENT DOCUMENTS

| | | | | |
|---|---|---|---|---|
| 3,852,585 A | * | 12/1974 | Brunger | B60Q 3/51 362/546 |
| 4,413,798 A | * | 11/1983 | Tamura | B60Q 3/51 248/27.1 |
| 5,239,449 A | * | 8/1993 | Wnuk | B60Q 3/51 362/490 |
| 6,612,640 B2 | * | 9/2003 | Hock | B60Q 3/51 296/146.7 |
| 6,749,324 B2 | * | 6/2004 | Nagai | B60Q 3/51 362/396 |
| 2009/0116255 A1 | * | 5/2009 | Kearns | B60Q 3/51 362/490 |

* cited by examiner

*Primary Examiner* — Laura K Tso
(74) *Attorney, Agent, or Firm* — BACON&THOMAS,PLLC (57) ABSTRACT

A vanity lamp is inserted such that a flange is in close contact with an edge of a mounting hole formed in a surface of a headliner, and a wing is rotated to be in close contact with the surface of the headliner to perform provisional assembling such that an edge portion of the mounting hole is provisionally assembled between the flange and the wing, thereby provisionally assembling the vanity lamp to the headliner without additionally mounting a lamp plate. Particularly, the wing is formed on the vanity lamp to be forcibly rotated, and a ledge is formed on a foldable central portion such that the wing is hooked on the ledge while facing the flange, and thereby anyone can easily and conveniently perform assembly by easily provisionally assembling the vanity lamp in the mounting hole.

4 Claims, 6 Drawing Sheets

VEHICLE VANITY LAMP

CROSS-REFERENCE TO RELATED APPLICATION

This application claims priority to and the benefit of Korean Patent Application No. 10-2023-0125347, filed on Sep. 20, 2023, the disclosure of which is incorporated herein by reference in its entirety.

BACKGROUND

1. Field of the Invention

The present invention relates to a vehicle vanity lamp, and more specifically, to a vehicle vanity lamp in which a vanity lamp is directly inserted to pass through a headliner such that a flange is in close contact with the headliner, and a wing included in the vanity lamp is rotated to press a surface of the headliner facing a roof panel to perform provisional coupling of the vanity lamp, thereby quickly and accurately assembling the vanity lamp at a predetermined location using an adhesive or the like in the provisionally coupled state without additionally manufacturing a lamp plate for mounting the vanity lamp. Accordingly, the vanity lamp is directly provisionally coupled to and mounted on the headliner even without manufacturing a jig for provisionally coupling the vanity lamp to the headliner.

2. Discussion of Related Art

In general, a vanity mirror is mounted in an interior of a vehicle for a driver or passenger to put on make-up or check their face. Particularly, a vanity mirror is mainly used by a female driver and helps her to easily fix her make-up or clean her face while driving. In addition, the vanity mirror is not only convenient to use while traveling, but also has a function of convenience for the driver or passenger and is included in a design of the vehicle.

As disclosed in Patent Documents 1 to 3, such a vanity mirror has a basic mirror function, and a vanity lamp function is also added to the basic mirror function in order for the vanity mirror to be used at night or in a dark place.

(Patent Document 1) Korean Laid-open Patent No. 10-2010-0009796

This is related to a vehicle vanity mirror device, and more specifically, to a vehicle vanity mirror device in which a mirror illuminating means and an interior illuminating means are installed on both surfaces of a vanity mirror and the interior illuminating means operates when the mirror is not used. In a structure of the vehicle vanity mirror device, a mirror is provided at one side of a body rotatably installed in a housing, and illumination is provided to a user at the same time when the mirror is used. The body includes the mirror, the mirror illuminating means for emitting light to the user using the mirror, and the vehicle interior illuminating means for emitting light to an interior of a vehicle when the mirror illuminating mirror does not operate.

(Patent Document 2) Korean Registration Patent No. 10-0610376

This is related to a double foldable rear vanity mirror for a vehicle, which may be easily used by a rear seat passenger of a vehicle when the rear seat passenger is positioned at any position or is in any situation or an interior thereof is dark. The rear vanity mirror, which is attached to a roof headlining of a vehicle roof panel, includes an upper body, which is hinge-coupled to the roof headlining by hinge pins formed on both end portions of an upper portion and in which a support including a through groove into which a fixing pin having a predetermined length is inserted is formed on a lower portion to protrude and hooking grooves on which hooking members of the roof headlining are hooked are formed in predetermined portions of both sides, and a lower body, in which a connecting part having a through groove formed at one side is formed such that the lower body is rotatably coupled to the upper body and which includes a mirror on a foldable inner side and two lamps at both sides of the mirror.

(Patent Document 3) Korean Laid-open Patent No. 10-2005-0022123

This is related to a vehicle vanity mirror, and a lighting device installed in the conventional vanity mirror itself has a problem that illumination toward a lower half body is low as only a facial area of a passenger is illuminated. A structure in consideration of such a problem includes an auxiliary lamp including an extension, which extends from a body of a vanity mirror and in which a hole is formed, a lamp, which is connected to a power source part located in the hole and emits light downward through the hole, a lens installed on an inner circumferential surface of the hole, and a switch, which is installed at a side opposite to the extension and controls power of the power source part so that a lighting device installed on the vanity mirror itself illuminates a facial area of a user and the auxiliary lamp illuminates a lower body of the user to allow the user to easily check the facial area, an object held by a hand, or a state thereof. In addition, the auxiliary lamp is operated independently of the vanity mirror to facilitate reading or checking a map, thereby further improving practicality and user convenience of the vanity mirror.

RELATED ART

Patent Documents (Patent Document 1) Korean Laid-open Patent No. 10-2010-0009796 (Published Date: Jan. 29, 2010)
(Patent Document 2) Korean Registration Patent No. 10-0610376 (Registration Date: Aug. 1, 2006)
(Patent Document 3) Korean Laid-open Patent No. 10-2005-0022123 (Published Date: Mar. 7, 2005)

SUMMARY OF THE INVENTION

However, the following problems occur when a vanity lamp is installed on a headliner, wherein the vanity lamp illuminates surroundings when such a vanity mirror is used.

(1) When a vanity lamp is installed on a headliner, a mounting hole is formed to pass through the headliner, a lamp plate is attached to the mounting hole, and then the vanity lamp is mounted on the lamp plate.

(2) Accordingly, since not only is the lamp plate additionally manufactured, but a process of attaching the additionally manufactured lamp plate to the headliner is also required, a manufacturing cost increases.

(3) In addition, a jig for maintaining a state in which the vanity lamp is provisionally coupled to the lamp plate is required to accurately position the vanity lamp at a predetermined location. Accordingly, not only is the jig for provisional coupling additionally manufactured, but working processes of performing the provisional coupling using the jig to fix the vanity lamp, assembling the vanity lamp, and then separating the jig are also further required.

(4) In this case, the lamp plate is attached to the mounting hole using an adhesive such as a hot melt, and when the lamp plate is disposed away from the predetermined location or is not attached at the predetermined location, a poor assembly situation, in which the vanity lamp cannot be mounted thereon, occurs.

The present invention is disclosed in consideration of the above problems and is directed to providing a vehicle vanity lamp that is inserted from an interior of a vehicle such that a flange formed on an edge of the vanity lamp exposed to the interior is in close contact with an edge of a mounting hole formed in a surface of a headliner and a wing provided to be in close contact with the vanity lamp is rotated to be in close contact with the surface of the headliner facing a roof panel to perform provisional assembling such that an edge portion of the mounting hole is provisionally assembled between the flange and the wing, thereby provisionally assembling the vanity lamp to the headliner without additionally mounting a lamp plate.

Particularly, the present invention is also directed to providing the vehicle vanity lamp, in which the wing is integrally formed with the vanity lamp to be forcibly rotated and a ledge is formed on a foldable central portion such that the wing is hooked on the ledge while facing the flange, and thereby anyone can easily and conveniently perform assembly by easily provisionally assembling the vanity lamp into the mounting hole.

In addition, the present invention is also directed to providing the vehicle vanity lamp, in which a height from the flange to the wing is provided to be slightly smaller than or equal to a thickness of the headliner such that the vehicle vanity lamp is firmly and supportively fixed when the wing is unfolded and is in contact with the surface of the headliner.

According to an aspect of the present invention, there is provided a vehicle vanity lamp installed to be inserted to pass through a mounting hole (11), which is formed to pass through the headliner (10), from an interior of a vehicle, the vehicle vanity lamp including a flange (110) formed on an edge exposed to the interior of the vehicle to protrude and be caught on an edge of the mounting hole (11), at least two wings (120) formed on the vanity lamp at locations a predetermined distance from the flange (110) to be folded to face the flange (110) or unfolded, and a ledge (130) over which the wing (120) forcibly passes such that the wing (120) is supportively fixed in close contact with a surface of the headliner in a state in which the flange (110) is installed in close contact with the edge of the mounting hole (11), wherein the vehicle vanity lamp is provisionally coupled to the mounting hole (11).

Particularly, the two wings (120) may be formed on edges of the vanity lamp at facing locations.

In addition, a height (H) from the flange (110) to the wing (120) may be smaller than a thickness of the headliner (10) such that the wing (120) forcibly presses the surface of the headliner (10).

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in more detail with reference to the accompanying drawings. Moreover, terms and words used in the present specification and claims should not be interpreted as being limited to commonly used meanings or meanings in dictionaries and should be interpreted as having meanings and concepts which are consistent with the technological scope of the invention based on the principle that the inventors have appropriately defined concepts of terms in order to describe the invention in the best way.

Therefore, since the embodiments described in this specification and components illustrated in the drawings are only exemplary embodiments and do not represent the overall technological scope of the invention, it should be understood that there may be various equivalents or modifications substituting the exemplary embodiments at the time of filing of this application.

[Structure of Vehicle Vanity Lamp]

As illustrated in FIGS. 1 to 6, a vehicle vanity lamp 100 according to the present invention includes a flange 110, at least two wings 120, and ledges 130.

Particularly, when the vanity lamp 100 is inserted into a mounting hole 11 formed in a headliner 10, the flange 110 is in close contact with an edge portion of the mounting hole 11 at an interior side, and the wings 120 are provided to pass through the mounting hole 11, unfold outward after having passed through the mounting hole 11, and be in close contact with a surface of the headliner 10 facing a roof panel in the mounting hole 11 so that the vanity lamp 100 is provisionally assembled in the mounting hole 11. In this case, as the wings 120 pass over the ledges 130, a hooking operation is performed to press the surface of the headliner 10 to perform the provisional assembling.

In this case, as the at least two wings 120 are formed at facing locations, even when the provisional assembling is performed as described above, and then an external force is applied to the vanity lamp 100 such that the vanity lamp 100 is tilted toward any one side, the vanity lamp 100 is not easily separated or withdrawn from the mounting hole 11 and maintains the provisionally assembled state.

In addition, as it is manufactured such that a height H from the flange 110 to the wing 120 is smaller than a thickness of the headliner 10, a surface of the wing 120 is forcibly pressed against the surface of the headliner 10, thereby minimizing movement of the vanity lamp 100 which is provisionally assembled.

Hereinafter, the structure will be described in more detail below with reference to the accompanying drawings. In this case, a reference numeral "10" denotes the headliner on which the vanity lamp is installed, and a reference numeral "11" denotes the mounting hole which is formed in the headliner for installing the vanity lamp.

A. Vanity Lamp

Figure 1:
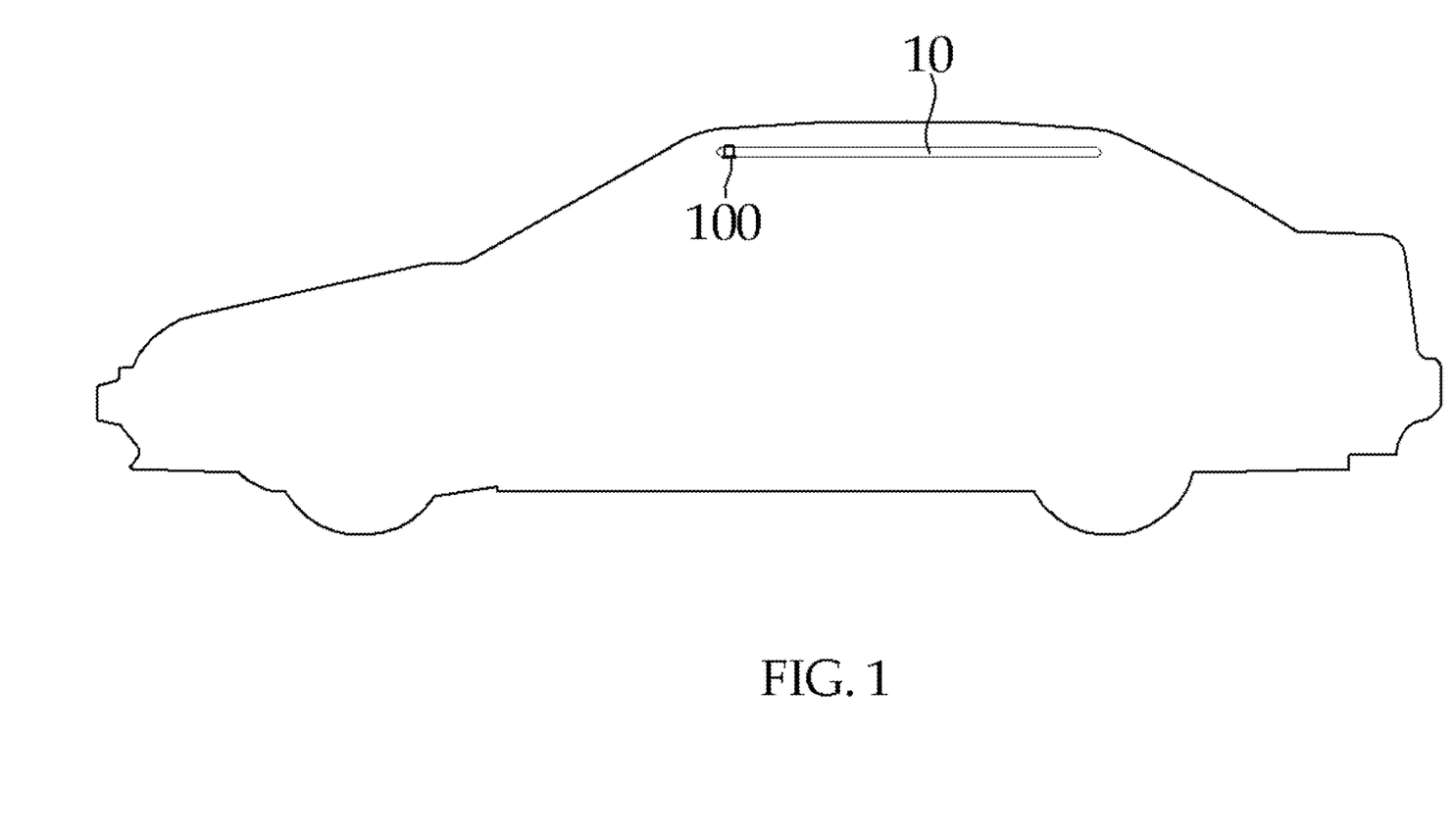
FIG. 1 is a schematic view illustrating a side surface of a vehicle for showing a mounting location of a headliner on which a vehicle vanity lamp is mounted according to the present invention.
Figure 2:
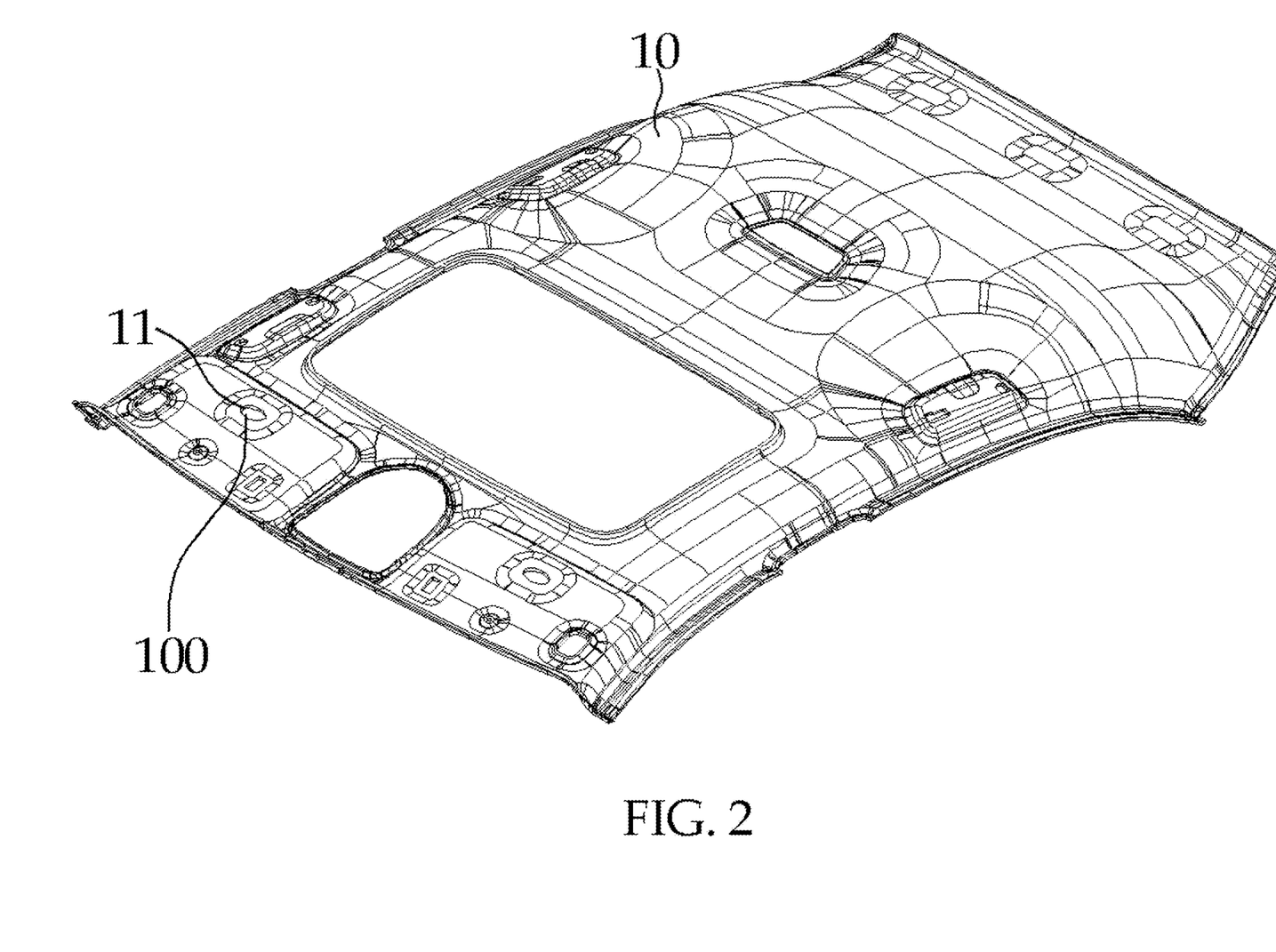
FIG. 2 is a perspective view illustrating the headliner on which the vehicle vanity lamp is mounted according to the present invention.
Figure 3:
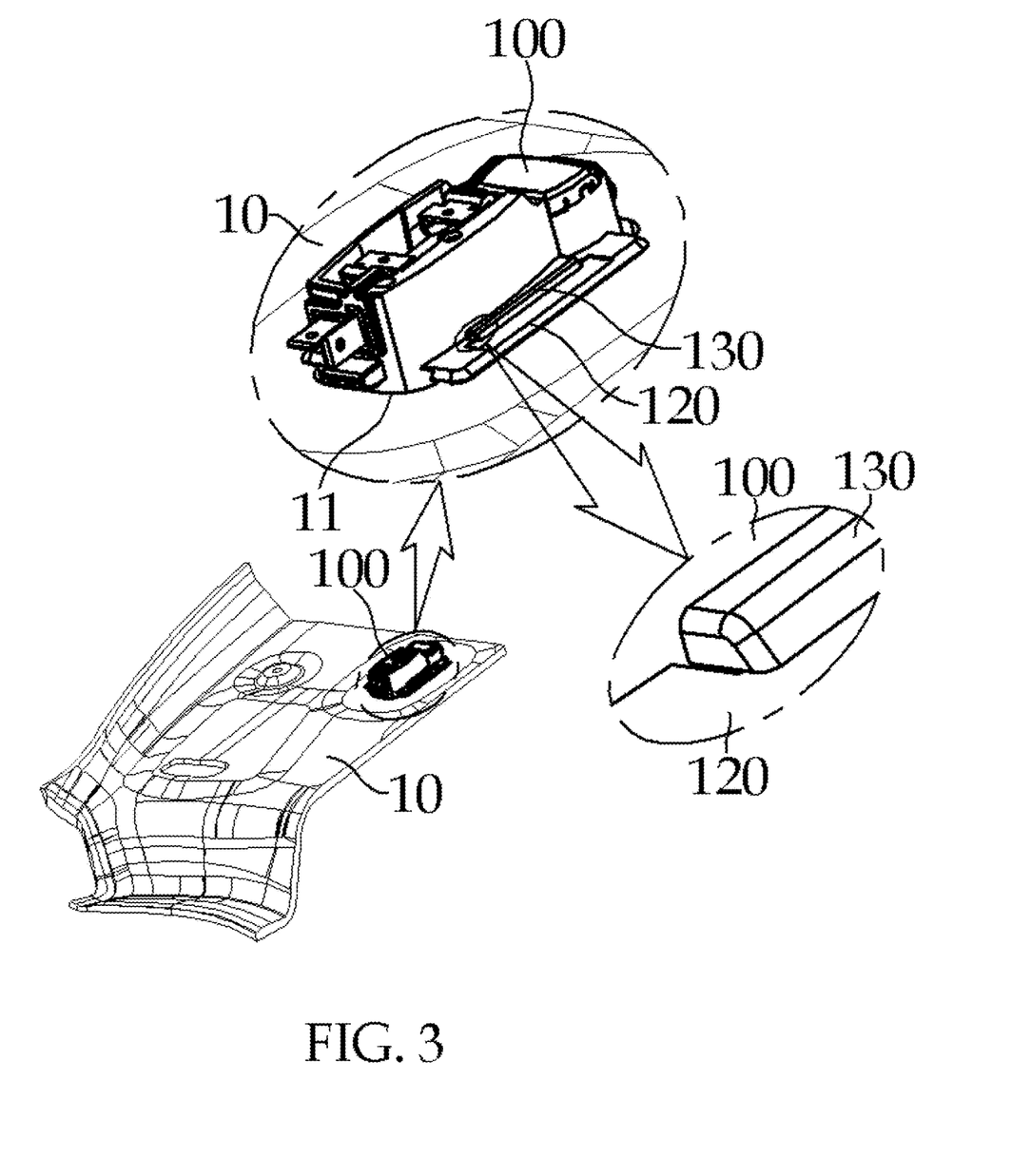
FIG. 3 is an enlarged cross-sectional view illustrating a portion of the headliner on which the vehicle vanity lamp is mounted according to the present invention.

As illustrated in FIGS. 1 to 3, the vanity lamp 100 is a module type lamp manufactured through a general technology to be installed in the mounting hole 11 formed in the headliner 10 and illuminate a facial area when a driver or passenger puts on make-up.

Although an example of the vanity lamp 100 used at a passenger seat is illustrated in FIGS. 2 and 3, the vanity lamp 100 may also be installed on the headliner 10 for the driver or passenger on a rear seat to use the vanity lamp 100.

In addition, as illustrated in FIGS. 3 to 6, the vanity lamp 100 includes the at least two wings 120 and the ledges 130.

B. Flange

Figure 4:
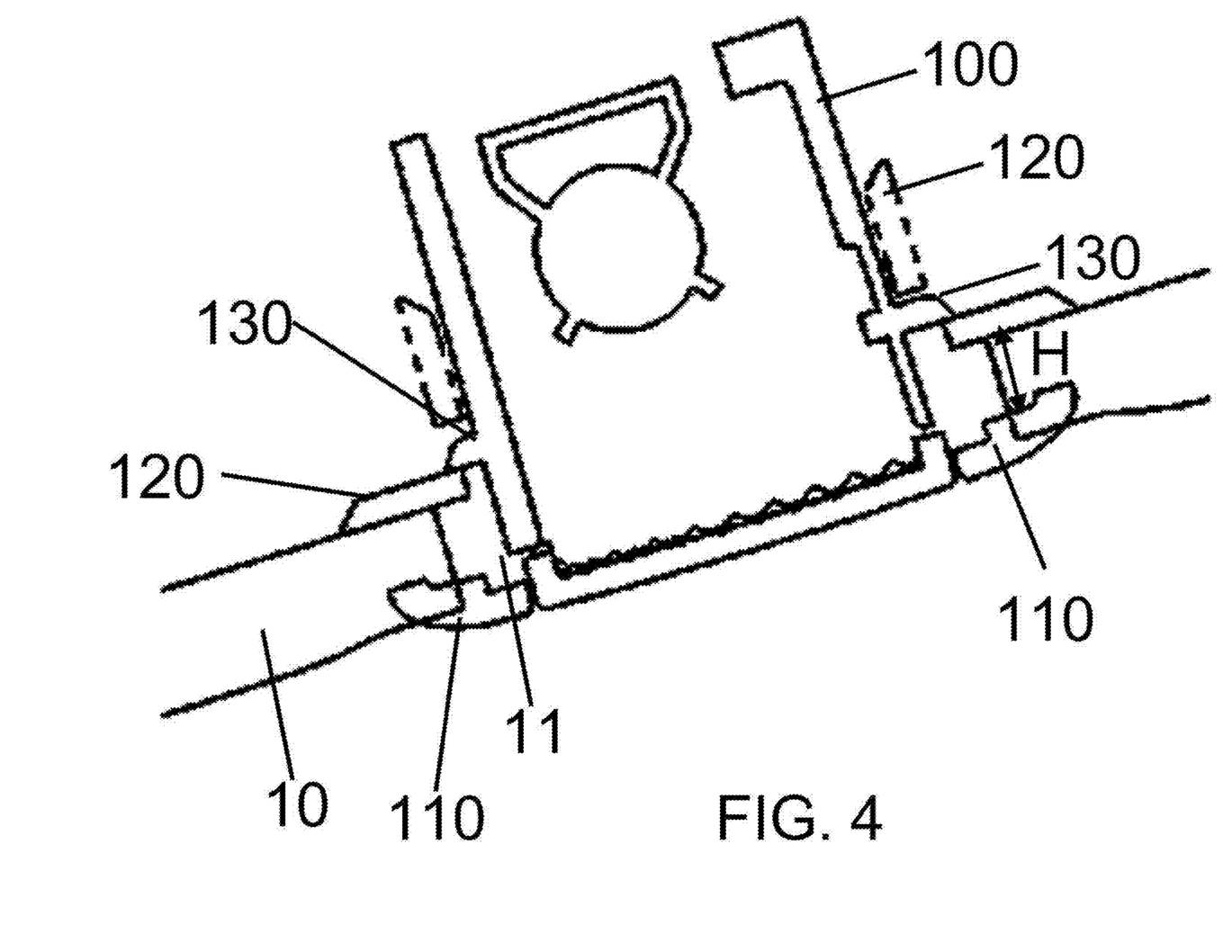
FIG. 4 is a cross-sectional view illustrating the portion of the headliner on which the vehicle vanity lamp is mounted according to the present invention.
Figure 5:
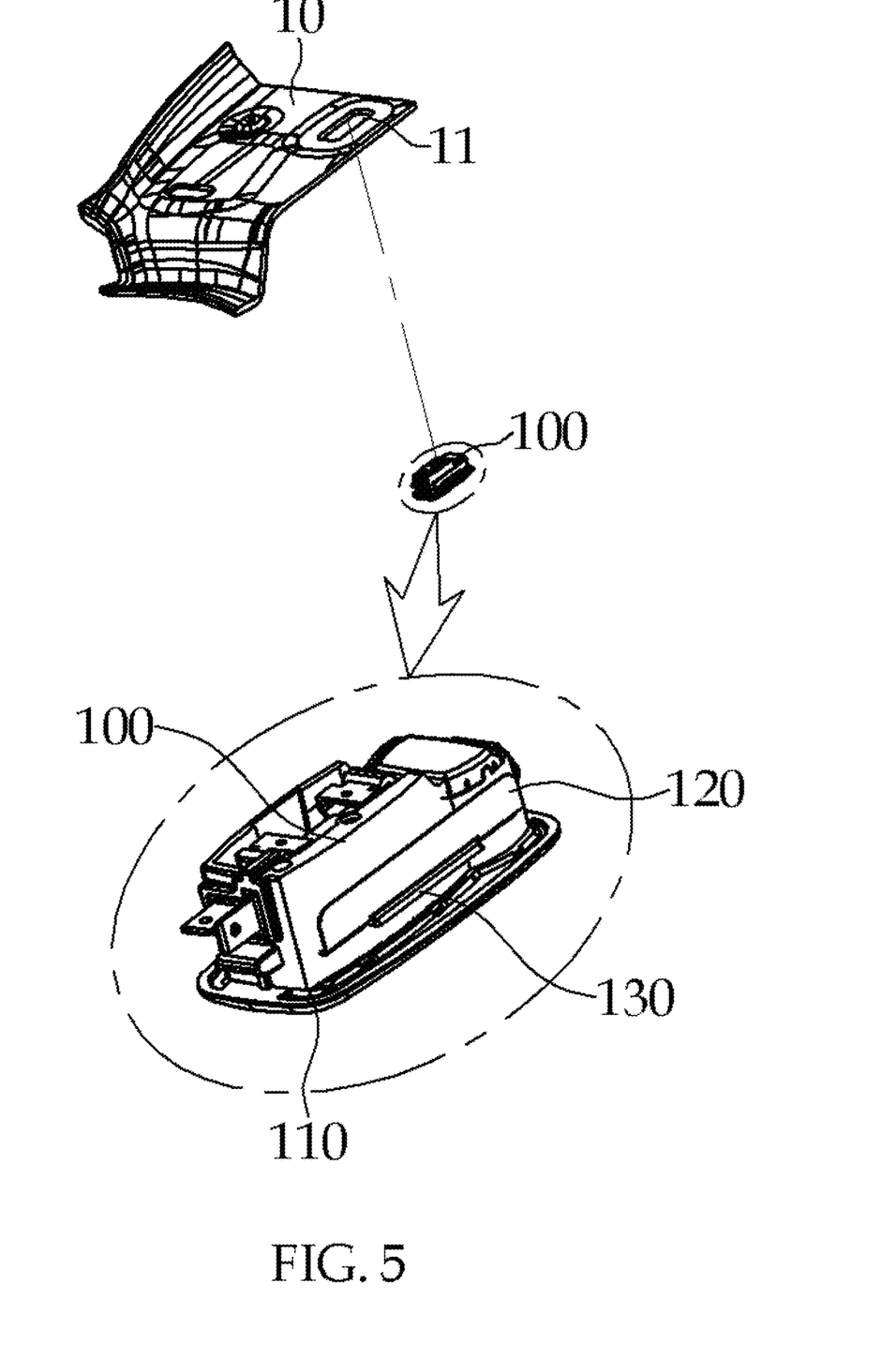
FIG. 5 is a perspective view illustrating a state in which the vehicle vanity lamp is separated from the mounting hole in order to pass through and be assembled in the mounting hole according to the present invention.

As illustrated in FIGS. 4 and 5, the flange 110 is formed at one side edge of the vanity lamp 100. In this case, it is preferable that the flange 110 be provided to finish an edge of the mounting hole 11, prevent the mounting hole 11 from being exposed to the interior side, and serve as a finishing member when the vanity lamp 100 is inserted into and assembled in the mounting hole 11 from the interior side of the vehicle. The flange 110 serves as a stopper to prevent the vanity lamp 100 from completely passing through and escaping from the mounting hole 11 when the vanity lamp 100 is inserted into the mounting hole 11.

C. Wing

As illustrated in FIGS. 3 to 6, the wing 120 is provided to be unfolded or folded with respect to the vanity lamp 100. In this case, the wing 120 is formed at a location a predetermined distance from the flange 110. This is to allow the headliner 10 to be compressed between the flange 110 and the wing 120 such that the vanity lamp 100 is provisionally coupled to the headliner 10 when the vanity lamp 100 is inserted into the mounting hole 11, and then the wing 120 is unfolded from a folded state.

In the exemplary embodiment of the present invention, as illustrated in FIG. 4, the height H from the flange 110 to the wing 120 is slightly smaller than the thickness of the headliner 10 to allow the headliner 10 to be compressed between the flange 110 and the wing 120 to perform provisional coupling.

In addition, in the exemplary embodiment of the present invention, the wing 120 may be integrally formed with the vanity lamp 100 and provided to be rotated using a connecting portion which is a soft portion manufactured to be thinner than other portions, or to be separately manufactured in addition to the vanity lamp 100 and installed on the vanity lamp 100 to be rotated about a pin.

In addition, in the exemplary embodiment of the present invention, as illustrated in FIG. 4, it is preferable that a pair of wings 120 be provided to face each other such that, when the vanity lamp 100 is inserted into and provisionally assembled in the mounting hole 11, even when the vanity lamp 100 rocks in the mounting hole 11, the vanity lamp 100 is not easily separated or divided from the mounting hole 11 and remains in a state of being provisionally coupled to the mounting hole 11. In the drawing, an example of two wings 120 facing each other is illustrated.

As illustrated in FIGS. 3 to 5, the wing 120 is hooked on the ledge 130 so that the vanity lamp 100 is provisionally coupled to the headliner 10.

D. Ledge

As illustrated in FIGS. 3 and 4, the ledge 130 serves as a stopper to prevent the wing 120 from returning to its original state when the wing 120 installed to face a surface of the ledge 130 on the vanity lamp 100 is rotated to face the flange 110.

As illustrated in FIG. 4, as the wing 120 rotates toward the flange 110, the wing 120 forcibly passes over the ledge 130 and is positioned at a hooking position, and in this case, the hooking position is a position at which the wing 120 faces the flange 110.

Meanwhile, in the exemplary embodiment of the present invention, as illustrated in FIGS. 3 to 5, it is preferable that the ledge 130 be formed by cutting a central portion of an edge portion of the vanity lamp 100 at which the wing 120 is rotatably supported by the vanity lamp 100 such that the ledge 130 stably serves as the stopper because the wing 120 is integrally formed with the vanity lamp 100 at both sides of the ledge 130 when the wing 120 passes over the ledge 130.

Figure 6:
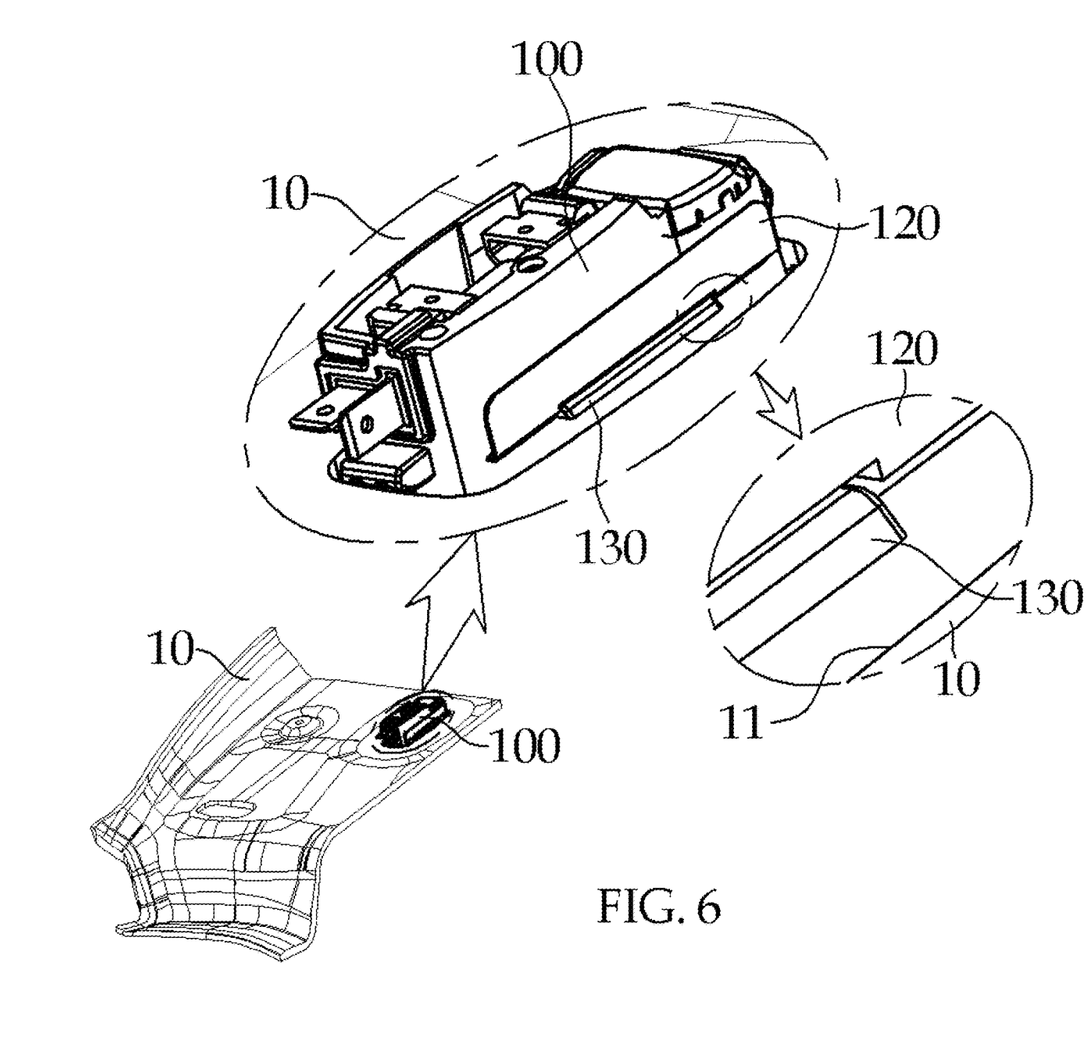
FIG. 6 is a perspective view illustrating a state in which the vehicle vanity lamp is inserted to pass through the mounting hole such that a flange is mounted to be in contact with an edge of the mounting hole.

In the present invention describe above, in a state in which the wing 120 is in close contact with the vanity lamp 100 as illustrated in FIG. 5, the vanity lamp 100 is inserted into the mounting hole 11 such that the wing 120 is inserted into the mounting hole 11 to protrude outward as illustrated in FIG. 6. Then, the wing 120 is unfolded to be in close contact with the surface of the headliner 10 to provisionally couple the vanity lamp 100 to the headliner as illustrated in FIGS. 3 and 4.

A vehicle vanity lamp according to the present invention has the following effects.

(1) Since assembling can be performed from a provisionally assembled state in which a vanity lamp is fitted to pass through a mounting hole formed in a headliner and then a wing is unfolded, the provisional assembling can be easily and conveniently performed without using a lamp plate that is mounted in a mounting hole when used as in the conventional vanity lamp.

(2) Accordingly, since not only can a cost for manufacturing the lamp plate be reduced, but a process of attaching the lamp plate to the headliner is also omitted, economical manufacturing can be performed accordingly.

(3) In addition, a jig used for assembling the vanity lamp does not need to be manufactured. Accordingly, there is an effect that a cost required for manufacturing the jig can be reduced, and since processes of mounting and removing the jig are omitted, the number of working processes can be reduced.

(4) Meanwhile, the vanity lamp is inserted into the mounting hole in a state in which the wing is in close contact with the vanity lamp, and the wing is unfolded such that a headlining is inserted between a flange and the wing in a state in which the flange is in close contact with the surroundings of an edge of the mounting hole to perform provisional assembling, and thereby anyone can easily unfold the wing to provisionally assemble the vanity lamp.

(5) In this case, a height from the wing and the flange is provided to be smaller than a thickness of the headliner such that the wing presses the headliner, thereby minimizing rotation of the vanity lamp inserted into the mounting hole to easily and accurately mount the vanity lamp at a predetermined location.

What is claimed is:

1. A vehicle vanity lamp installed to be inserted to pass through a mounting hole (11), which is formed to pass through the headliner (10), from an interior of a vehicle, the vehicle vanity lamp comprising:
    a flange (110) formed on an edge portion exposed to the interior of the vehicle to protrude and be caught on an edge of the mounting hole (11);
    at least two wings (120) formed on the vanity lamp at locations a predetermined distance from the flange (110) to be folded to face the flange (110) or unfolded; and
    a ledge (130) over which the wing (120) forcibly passes such that the wing (120) is supportively fixed in close contact with a surface of the headliner when the wing (120) passing through the mounting hole (11) is bent toward the surface of the headliner (10) in a state in which the flange (110) is installed in close contact with an edge of the mounting hole (11),
    wherein the vehicle vanity lamp is provisionally coupled to the mounting hole (11).

2. The vehicle vanity lamp of claim 1, wherein the two wings (120) are formed on edges of the vanity lamp at facing locations.

3. The vehicle vanity lamp of claim 2, wherein a height (H) from the flange (110) to the wing (120) is smaller than a thickness of the headliner (10) such that the wing (120) forcibly presses the surface of the headliner (10).

4. The vehicle vanity lamp of claim 1 wherein a height (H) from the flange (110) to the wing (120) is smaller than a thickness of the headliner (10) such that the wing (120) forcibly presses the surface of the headliner (10).

* * * * *